United States Patent
Zhuang et al.

(10) Patent No.: US 10,404,329 B2
(45) Date of Patent: Sep. 3, 2019

(54) NETWORK SWITCH FOR A DISTRIBUTED ANTENNA NETWORK

(71) Applicant: Dali Systems Co. Ltd., George Town Grand Cayman (KY)

(72) Inventors: Qianqi Zhuang, Richmond BC (CA); Shawn Patrick Stapleton, Burnaby BC (CA)

(73) Assignee: Dali Systems Co. Ltd., Grand Cayman (KY)

( * ) Notice: Subject to any disclaimer, the term of this patent is extended or adjusted under 35 U.S.C. 154(b) by 0 days.

(21) Appl. No.: 14/590,447

(22) Filed: Jan. 6, 2015

(65) Prior Publication Data
US 2015/0303999 A1 Oct. 22, 2015

Related U.S. Application Data

(60) Provisional application No. 61/924,127, filed on Jan. 6, 2014.

(51) Int. Cl.
*H04B 7/02* (2018.01)
*H04B 7/024* (2017.01)
*H04W 84/22* (2009.01)

(52) U.S. Cl.
CPC ............ *H04B 7/024* (2013.01); *H04W 84/22* (2013.01)

(58) Field of Classification Search
None
See application file for complete search history.

(56) References Cited

U.S. PATENT DOCUMENTS

| 7,231,224 | B1 | 6/2007 | Chesson et al. |
| 2003/0179703 | A1 | 9/2003 | Levy et al. |
| 2004/0174900 | A1 | 9/2004 | Volpi et al. |
| 2005/0157675 | A1 | 7/2005 | Feder et al. |
| 2005/0226625 | A1 | 10/2005 | Wake et al. |
| 2006/0215598 | A1 | 9/2006 | Rai et al. |
| 2007/0001821 | A1 | 1/2007 | Berkman |
| 2008/0107014 | A1 | 5/2008 | Huang et al. |

(Continued)

FOREIGN PATENT DOCUMENTS

| JP | 2004040802 A | 2/2004 |
| JP | 2007282143 A | 10/2007 |

(Continued)

OTHER PUBLICATIONS

International Search Report and Written Opinion dated May 1, 2015, PCT/US2015/010303, 11 pages.

(Continued)

*Primary Examiner* — Kodzovi Acolatse

(57) ABSTRACT

A system for transporting IP data in a Distributed Antenna System includes at least one Digital Access Units (DAU) having a plurality of optical input/output ports and at least one Ethernet port and a plurality of Digital Remote Units (DRUs) coupled to the at least one DAU. Each of the plurality of DRUs has a plurality of optical input/output ports and at least one Ethernet port. The at least one DAU includes a Framer/Deframer operable to separate cellular payload data from IP data and a network switch operable to buffer the cellular payload data and the IP data and to route the IP data received from the plurality of DRUs to the at least one Ethernet port of the DAU.

19 Claims, 12 Drawing Sheets

(56) References Cited

U.S. PATENT DOCUMENTS

| | | | |
|---|---|---|---|
| 2008/0181171 A1* | 7/2008 | Koziy | H04W 88/085 370/328 |
| 2008/0181282 A1* | 7/2008 | Wala | H04B 1/18 375/130 |
| 2009/0047924 A1 | 2/2009 | Ray et al. | |
| 2009/0112585 A1 | 4/2009 | Cox et al. | |
| 2009/0180426 A1* | 7/2009 | Sabat | H04W 88/085 370/328 |
| 2010/0099451 A1 | 4/2010 | Saban et al. | |
| 2010/0177759 A1* | 7/2010 | Fischer | H04W 88/085 370/345 |
| 2010/0178936 A1* | 7/2010 | Wala | G01S 5/0054 455/456.2 |
| 2010/0246482 A1 | 9/2010 | Erceg et al. | |
| 2010/0266287 A1 | 10/2010 | Adhikari et al. | |
| 2010/0296458 A1* | 11/2010 | Wala | H04B 1/707 370/329 |
| 2011/0135013 A1 | 6/2011 | Wegener | |
| 2011/0135308 A1 | 6/2011 | Tarlazzi et al. | |
| 2012/0039254 A1 | 2/2012 | Stapleton et al. | |
| 2012/0039320 A1 | 2/2012 | Lemson et al. | |
| 2012/0057572 A1* | 3/2012 | Evans | H04W 88/085 370/338 |
| 2012/0069880 A1* | 3/2012 | Lemson | H04B 1/18 375/220 |
| 2012/0077531 A1 | 3/2012 | Acharya et al. | |
| 2012/0127938 A1 | 5/2012 | Lv et al. | |
| 2012/0134666 A1 | 5/2012 | Casterline et al. | |
| 2012/0188949 A1 | 7/2012 | Salkintzis et al. | |
| 2012/0257516 A1 | 10/2012 | Pazhyannur et al. | |
| 2012/0329523 A1* | 12/2012 | Stewart | H03F 1/3247 455/562.1 |
| 2013/0029655 A1 | 1/2013 | Gao | |
| 2013/0114963 A1 | 5/2013 | Stapleton et al. | |
| 2013/0201916 A1 | 8/2013 | Kummetz et al. | |
| 2013/0272202 A1 | 10/2013 | Stapleton et al. | |
| 2014/0016583 A1* | 1/2014 | Smith | H04J 14/0227 370/329 |
| 2014/0031049 A1 | 1/2014 | Sundaresan et al. | |
| 2014/0078906 A1 | 3/2014 | Chen et al. | |
| 2014/0119281 A1 | 5/2014 | Kummetz et al. | |
| 2014/0140225 A1* | 5/2014 | Wala | H04W 24/06 370/252 |
| 2014/0146797 A1 | 5/2014 | Zavadsky et al. | |
| 2014/0314061 A1 | 10/2014 | Trajkovic et al. | |
| 2015/0110014 A1 | 4/2015 | Wang et al. | |
| 2015/0207545 A1 | 7/2015 | Zhuang et al. | |

FOREIGN PATENT DOCUMENTS

| | | |
|---|---|---|
| JP | 2013541255 A | 11/2013 |
| JP | 2013541875 A | 11/2013 |

OTHER PUBLICATIONS

PCT/US2015/010303 , "International Preliminary Report on Patentability", dated Jul. 21, 2016, 9 pages.

European Patent Application No. EP15733064.8 , "Extended European Search Report", dated Jul. 25, 2017, 7 pages.

U.S. Appl. No. 15/907,153, Non-Final Office Action dated Nov. 16, 2018, 25 pages.

Chinese Patent Application No. 201480069382.1, Notice of Decision to Grant dated Jan. 8, 2019, 6 pages.

Israeli Patent Application No. 246210, Office Action dated Nov. 12, 2018, 6 pages.

Japanese Patent Application No. 2016-541192, Notice of Reasons for Rejection dispatched on Jan. 7, 2019, 9 pages.

Japanese Patent Application No. 2016-562732, Notice of Reasons for Rejection dispatched on Jan. 7, 2019, 9 pages.

* cited by examiner

| Address | Sub-Address (4 bits) | Reserved (8 bits) | TTL (4 bits) | Pnum (4 bits) | MAC address (48 bits) |
|---|---|---|---|---|---|
| 0 | 0 | | | | |
| | ... | | | | |
| | 15 | | | | |
| 1 | 0 | | | | |
| | ... | | | | |
| | 15 | | | | |
| ... | 0 | | | | |
| | ... | | | | |
| | 15 | | | | |
| 255 | 0 | | | | |
| | ... | | | | |
| | 15 | | | | |

900

Hash Table Structure

*FIG. 9*

NETWORK SWITCH FOR A DISTRIBUTED ANTENNA NETWORK

CROSS-REFERENCES TO RELATED APPLICATIONS

This application claims priority to U.S. Provisional Patent Application No. 61/924,127, filed on Jan. 6, 2014, entitled "Network Switch for a Distributed Antenna Network," the disclosure of which is hereby incorporated by reference in its entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a cafeteria location in the building. At that time, a large number of subscribers have moved away from their offices and usual work areas. It's likely that during lunchtime there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

To address these issues, Distributed Antenna Systems (DAS) have been developed and deployed. Despite the progress made in DAS, there is a need in the art for improved methods and systems related to DAS.

SUMMARY OF THE INVENTION

The present invention generally relates to communication systems using complex modulation techniques. More specially, the present invention relates to distributed antenna systems that contain a microprocessor or other digital components, such as a Field Programmable Gate Array (FPGA) or Application Specific Integrated Circuit (ASIC). Embodiments of the present invention provide a means of networking IP data over a Distributed Antenna System (DAS). A Distributed Antenna System provides a method of transporting mobile data between Base Transceiver Stations (BTSs) and remotely located antennas. IP data can be transported over the same medium as the mobile data if the two data streams are multiplexed in a Frame. A network switch is utilized to efficiently route the IP data between the multiple ports in the DAS network.

According to an embodiment of the present invention, a system for transporting IP data in a Distributed Antenna System is provided. The system includes at least one Digital Access Units (DAU) having a plurality of optical input/output ports and at least one Ethernet port and a plurality of Digital Remote Units (DRUs) coupled to the at least one DAU. Each of the plurality of DRUs has a plurality of optical input/output ports and at least one Ethernet port. The at least one DAU includes a Framer/Deframer operable to separate cellular payload data from IP data and a network switch operable to buffer the cellular payload data and the IP data and to route the IP data received from the plurality of DRUs to the at least one Ethernet port of the DAU.

According to another embodiment of the present invention, a system for transporting IP data in a Distributed Antenna System is provided. The system includes at least one Digital Access Units (DAU) having a plurality of optical input/output ports and at least one Ethernet port and a plurality of Digital Remote Units (DRUs) coupled to the at least one DAU. Each of the plurality of DRUs has a plurality of optical input/output ports and at least one Ethernet port. Each of the plurality of DRUs includes a Framer/Deframer operable to separate cellular payload data from IP data and a network switch operable to buffer the cellular payload data and the IP data and to route the IP data received from the at least one DAU to the at least one Ethernet port of the DRU.

According to a specific embodiment of the present invention, a method of operating a Distributed Antenna System (DAS) is provided. The method includes receiving, at a digital remote unit (DRU) of the DAS, downstream IP data and downstream cellular data and separating the downstream IP data from the downstream cellular data. The method also includes providing information associated with the downstream cellular data to an antenna coupled to the DRU and outputting the downstream IP data at an Ethernet port of the DRU.

According to another specific embodiment of the present invention, a method of operating a digital access unit (DAU) of a Distributed Antenna System (DAS) is provided. The method includes receiving, at the DAU, upstream IP data and upstream cellular data and separating the upstream IP data from the upstream cellular data. The method also includes providing information associated with the upstream cellular data to an RF port of the DAU and outputting the upstream IP data at an Ethernet port of the DAU.

According to an embodiment of the present invention, a system for transporting IP data in a Distributed Antenna System includes a plurality of Digital Access Units (DAUs). The plurality of DAUs may be coupled and operable to route signals between the plurality of DAUs. A plurality of Digital Remote Units (DRUs) are coupled to the plurality of DAUs and operable to transport signals between DRUs and DAUs. The system also includes a plurality of DAU ports, DRU ports, and a Framer/Deframer. The cellular payload data may be separated from the IP data. The system also includes a network switch. The IP data from a plurality of DAU and DRU ports may be buffered and routed to a plurality of DAU and DRU ports.

According to another embodiment of the present invention, a system for transporting IP data in a Distributed Antenna System is provided. The system includes a plurality of Digital Access Units (DAUs) and a plurality of Digital Remote Units (DRUs) coupled to the plurality of DAUs and operable to transport signals between DRUs and DAUs. The plurality of DAUs are coupled and operable to route signals between the plurality of DAUs. The plurality of DAUs and the plurality of DRUs include ports and a Framer/Deframer operable to separate cellular payload data from IP data. The system also includes a network switch. The IP data from a plurality of DAU and DRU ports are buffered and routed to a plurality of DAU and DRU ports. The DAU and DRU ports for the Network Switch can be a plurality of either optical, router, Ethernet, or microprocessor ports.

The plurality of DAUs can be coupled via at least one of Ethernet cable, Optical Fiber, Microwave Line of Sight Link, Wireless Link, or Satellite Link and the plurality of DAUs can be coupled to the plurality of DRUs via at least one of Ethernet cable, Optical Fiber, Microwave Line of Sight Link, Wireless Link, or Satellite Link. The DRUs can be connected in a daisy chain configuration or the DRUs can be connected to the DAUs in a star configuration. In another embodiment, the DRUs can be connected in a loop to a plurality of DAUs.

The present invention is applicable to any communication system that transports mobile data over a medium. A communication link can be established between a local host unit and a remote unit. A Field Programmable Gate Array (FPGA) or Application Specific Integrated Circuit (ASIC) that incorporates a processor, such as a Power PC or Microblaze, controls the data flow to and from the Remote Unit.

BRIEF DESCRIPTION OF THE DRAWINGS

FIG. 9 shows the Hash Table Structure that maps the MAC address to a Hash address according to an embodiment of the present invention.

DETAILED DESCRIPTION OF SPECIFIC EMBODIMENTS

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs.

Figure 1:
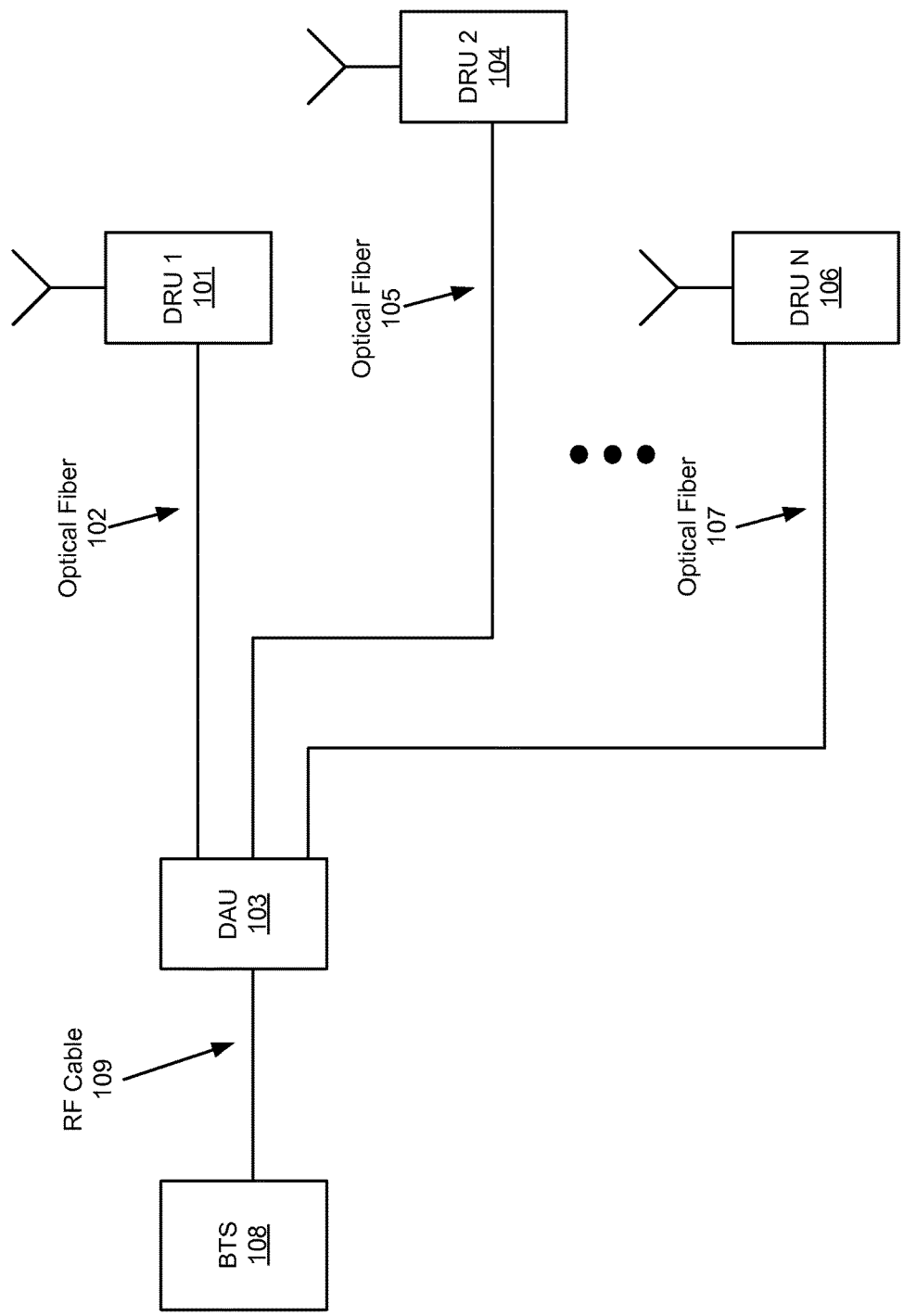
FIG. 1 is a block diagram showing a Distributed Antenna System (DAS), which includes one or more Digital Access Units (DAUs) and one or more Digital Remote Units (DRUs).

An embodiment shown in FIG. 1 illustrates a basic DAS network architecture according to an embodiment of the present invention and provides an example of a data transport scenario between a Base Station and multiple DRUs. In this embodiment, the DRUs are connected to the DAU in a star configuration to achieve coverage in a specific geographical area.

FIG. 1 is a block diagram of one embodiment of a Distributed Antenna System which includes one or more Digital Access Units 103 and one or more Digital Remote Units 101. The DAUs interface to one of more Base Transceiver Stations (BTS) 108. Up to N DRUs can be utilized in conjunction with a DAU. Additional description related to DAS architectures is provided in U.S. patent application Ser. No. 13/211,243, filed on Aug. 16, 2011, the disclosure of which is hereby incorporated by reference in its entirety for all purposes.

Figure 2:
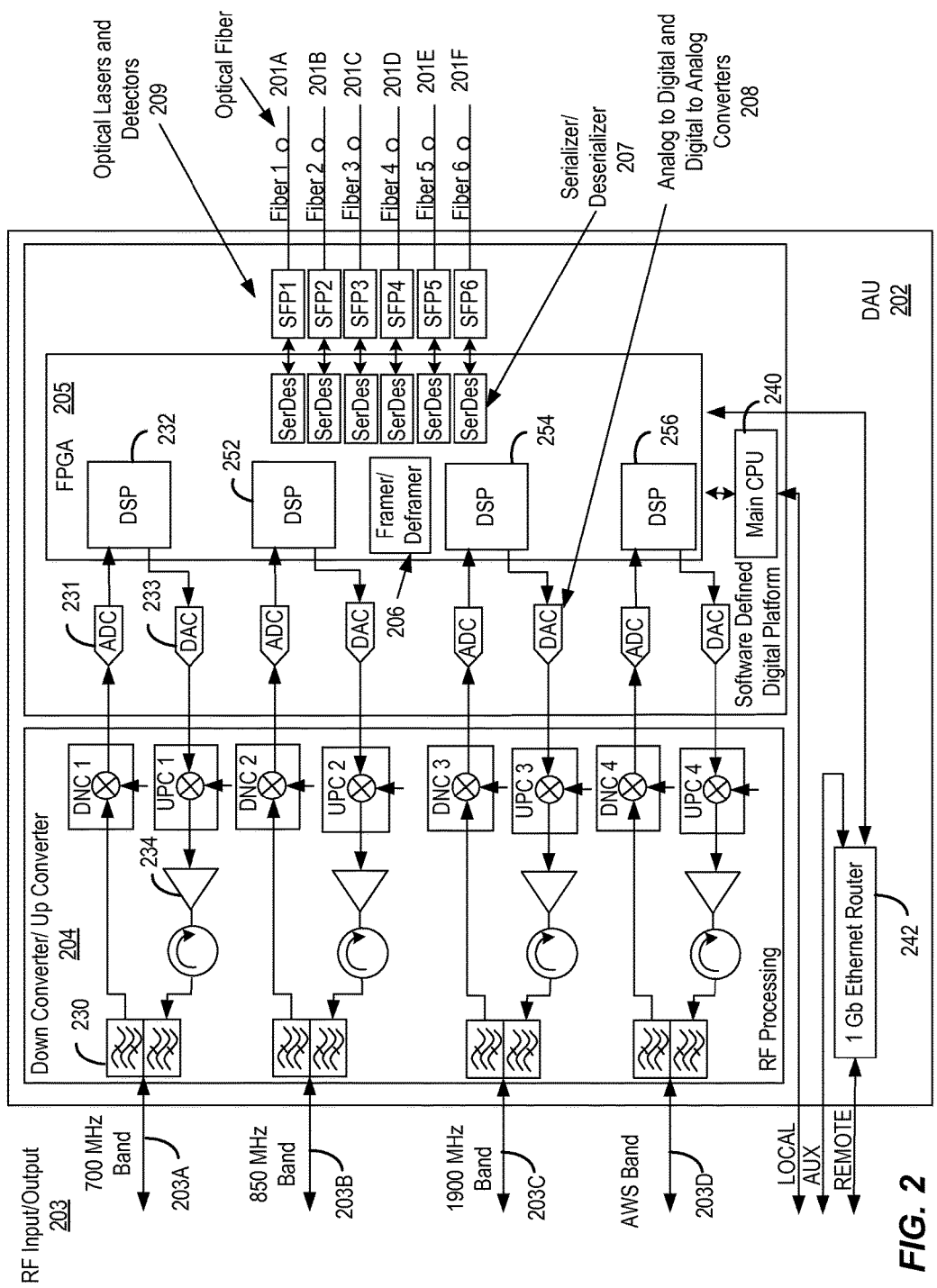
FIG. 2 is a block diagram of a Digital Access Unit (DAU) according to an embodiment of the present invention.

FIG. 2 is a block diagram showing a DAU system for base-station applications according to one embodiment of the present invention. The digital access unit (DAU) system 202 for the base-station applications has RF input and output 203 that receives and transmits RF input/output signals, illustrated by RF inputs/outputs at a number of bands (e.g., 700 MHz, 850 MHz, 1900 MHz, and the AWS band), and optical input and output ports illustrated by optical fibers 201A-201F.

The DAU system 202 includes four key components; an FPGA-based digital component 205, a down converter and up-converter component 204, analog to digital and digital to analog converter component 208, and an optical laser and detector component 209. The FPGA-based digital component 205 includes a field programmable gate array (FPGA), digital signal processing (DSP) units, Framers/De-Framers, and Serializers/De-Serializers. Additional description related to DAUs is provided in U.S. patent application Ser. No. 12/767,669, filed on Apr. 26, 2010, Ser. No. 13/211,236, filed on Aug. 16, 2011, Ser. No. 13/211,247, filed on Aug. 16, 2011, and Ser. No. 13/602,818, filed on Sep. 4, 2012, all of which are hereby incorporated by reference in their entirety for all purposes.

As illustrated in FIG. 2, the DAU 202 is a quad-band Digital Access Unit (i.e., operating at multiple bands, which can include transmit/receive input/output at the 700 MHz 203A, 900 MHz 203B, 1900 MHz 203C, AWS 203D bands, although other bands are included within the scope of the present invention. The DAU can have an RF base station interface (typically to four sectors). Although the DAU 202 illustrated in FIG. 2 includes the four Tx/Rx RF ports described above, fewer or greater number of Tx/Rx RF ports can be utilized. On the optical interface side (i.e., the right side of FIG. 2), the DAU is connected to multiple remote radio units (RRUs), also referred to as digital remote units (RRUs) in a star configuration, a daisy chain configuration, or a combination thereof depending on the particular network design. As illustrated in FIG. 2, six optical fiber interfaces 201A-201F are utilized in the illustrated embodiment.

Referring to FIG. 2, the downlink path RF signals entering the DAU at the duplex RF input/output port 203A can be separated from uplink signals by RF duplexer 230 and frequency-converted by down converter/up converter 204, digitized by analog to digital converter 231, and converted to baseband by digital processing function 232, which is part of the FPGA 205. Similar components are utilized for the other duplex RF input/output ports as illustrated in FIG. 2. Data streams are then I/Q mapped and framed with monitoring and control signals in Framer/Deframer 206. Specific parallel data streams are then independently converted to serial data streams in SerDes 207 and translated to optical signals by pluggable SFP optical transceiver modules 209, and delivered to optical fibers 201A-201F. The six optical fibers deliver the serial optical data streams to multiple RRUs. The other three sets of downlink RF paths operate similarly.

Referring to FIG. 2, following the description above, the uplink path optical signals received from the RRUs are received using optical fibers 201A-201F, de-serialized by SerDes 207, deframed by Framer/Deframer 206, and digitally up-converted by digital processing function 232. Data streams are then converted to analog IF by digital to analog converter 233 and up-converted by upconverter UPC1, then amplified by RF amplifier 234 and filtered by duplexer 230. The uplink RF signal enters the base station at Uplink RF Port 203A. CPU 240 feeding Ethernet router 242 provides separate Ethernet ports (REMOTE and AUX) for different applications.

As described more fully herein, the input/output associated with the Ethernet router 242 is able to be communicated through the optical ports associated with optical fibers 201A-210F. The switching and routing of the IP traffic through the DAU enables the IP traffic to be delivered to and received from the digital remote units as described herein. Various embodiments utilize different switching and routing protocols in relation to IP traffic as well as the RF data. As an example, the IP traffic can be split evenly (~166 Mbps each) between the optical ports and optical fibers 201A-201F. In other implementations, one optical port receives higher bandwidth (e.g., 300 Mbps) IP traffic while other optical ports are relatively quiet. Accordingly, embodiments of the present invention enable the system to meet peak demand IP traffic rates by switching and routing of the IP traffic between the Ethernet router 242 and the optical fibers 201A-201F.

Figure 3:
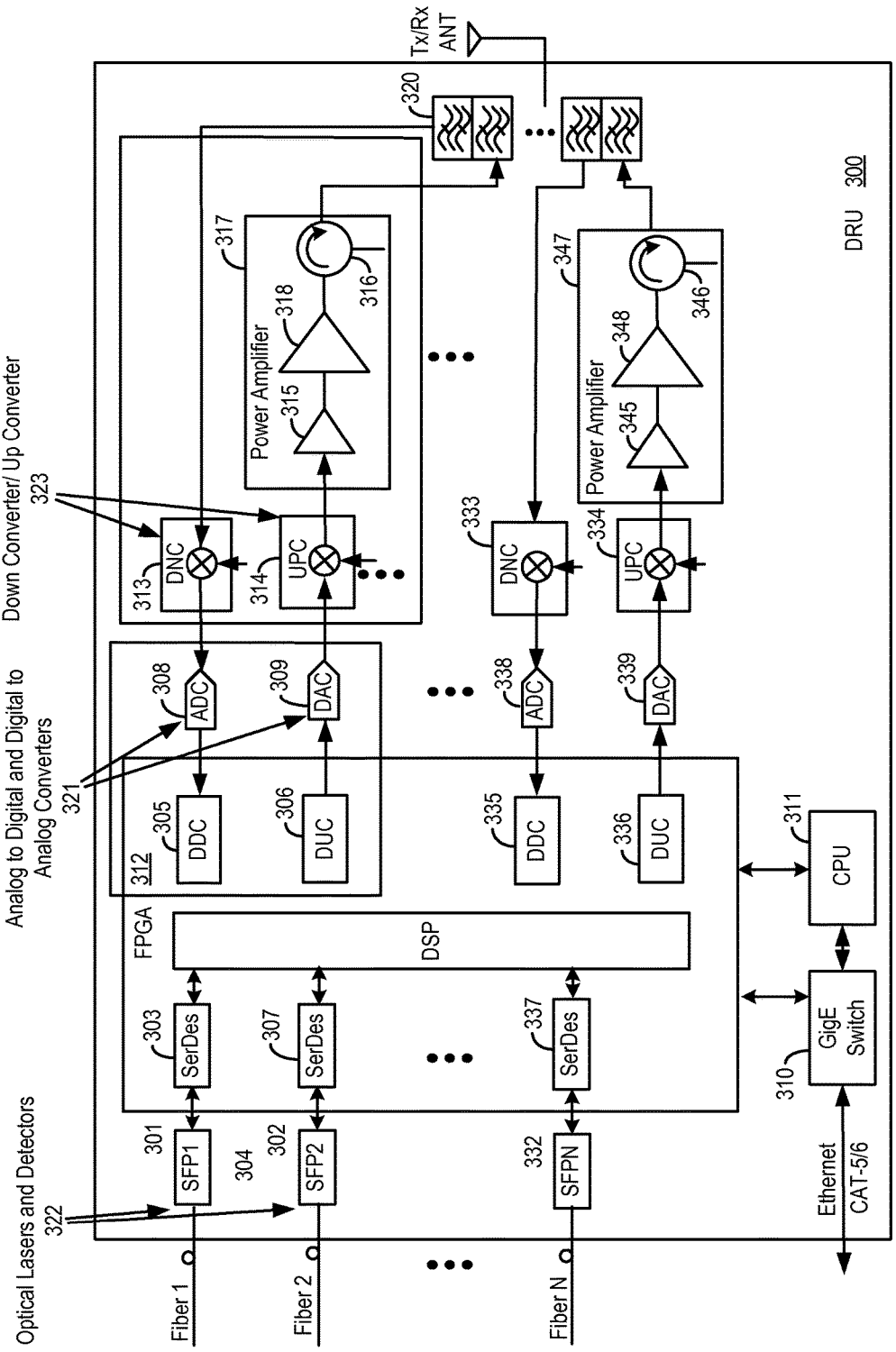
FIG. 3 is a block diagram of a Digital Remote Unit (DRU) according to an embodiment of the present invention.

FIG. 3 is a block diagram showing a Digital Remote Unit (DRU) system according to one embodiment of the present invention. The DRU system 300 has bidirectional optical signals carried on one or more of Fiber 1 and/or Fiber 2 to communicate with the DAU illustrated in FIG. 2 and/or other DRUs and bidirectional RF port 320 operable to transmit and receive RF signals transmitted and received by the RF antenna (Tx/Rx ANT). The DRU system includes four key components, described more fully below: an FPGA-based digital component 312, a down converter 313 and an up-converter 314, analog to digital (308) and digital to analog converter (309) (the group labeled as 321), an optical laser and detector component that includes small form-factor pluggable (SFP) modules SFP1 and SFP2, and a power amplifier component 318.

FIG. 3 illustrates a dual-band Remote Radio Head Unit, also referred to as a digital remote unit, with one combined downlink/uplink antenna port 320. In other embodiments, single or other multi-band DRUs are utilized, for example, with downlink/uplink antenna ports operating at 850 MHz, 1900 MHz, and the like. Referring to FIG. 3, Fiber 1 connected to SFP1 301, is a high speed fiber cable that transports data between the (base station and) host unit location and the Remote Radio Head Unit. Fiber 2 can be used to daisy chain other remote radio head units, which are thereby interconnected to the base station or DAU. The software-defined digital platform 312, which can be referred to as an FPGA, performs baseband signal processing, typically in an FPGA or equivalent. The FPGA includes Serializer/Deserializer 303. The deserializer portion extracts the serial input bit stream from the optical fiber transceiver 301 and converts it into a parallel bit stream. The serializer portion performs the inverse operation for sending data from the Remote Radio Head Unit to the base station. In one embodiment, the two distinct bit streams communicate with the base stations using different optical wavelengths over one fiber, although multiple fibers can be used in alternative arrangements. The DSP unit 304 includes a framer/deframer that deciphers the structure of the incoming bit stream and sends the deframed data to a Crest Factor Reduction Algorithm module that is a component of the DSP unit 304. The Crest Factor Reduction Algorithm module reduces the Peak-to-Average Ratio of the incoming signal so as to improve the Power amplifier DC-to-RF conversion efficiency. The waveform is then presented to a Digital Predistorter block in the DSP 304. The digital predistorter compensates for the non-linearities of the Power Amplifier 318 in an adaptive feedback loop. The downlink RF signal from the Power Amplifier is fed to duplexer 317 and is then routed to the antenna port 320.

Digital Upconverter 314 filters and digitally translates the deframed signal to an IF frequency. Digital to analog converter 309 performs D-A conversion and feeds an IF signal into upconverter 314. The Framer of the DSP unit 304 takes the data from the digital downconverter 305 and packs it into a Frame for transmission to the BTS via the optical fiber transceiver 301. Analog to Digital converter 308 is used to translate the analog RF uplink signal into digital signals. The receiver also includes a downconverter 313.

Ethernet cable can be connected to gigabit Ethernet switch 310, which is coupled to CPU 311 and is used to locally communicate with the DRU. In some embodiments, the bidirectional Ethernet switch 310 at the remote is connected to a WiFi access point that can receive and transmit data from/to the DAU illustrated in FIG. 2. In one implementation, IP traffic is received from the DAU at Fibers 1 through N, is processed in the DRU 300 and then communicated through Ethernet switch 310. Because the system is bidirectional, data flow from the Ethernet switch to the DAU through Fibers 1 to N is also included within the scope of the present invention.

Referring to FIG. 3, in some implementations, a single optical fiber (e.g., Fiber 1) connects the DRU to the DAU. In other implementations, multiple optical fibers are utilized. In the single fiber implementation, IP traffic is carried on the fiber along with RF data. The FPGA 312 separates the RF signal (i.e., the I & Q data associated with the RF signal) and provides the RF signal to the amplifiers 317 and 347 and the Tx/Rx antenna for broadcast to mobile devices. The FPGA separates the IP data, which is then provided to the Ethernet switch 310 and to a port that is connected to the Ethernet cable illustrated. Bidirectional IP traffic is also illustrated. One of ordinary skill in the art would recognize many variations, modifications, and alternatives.

Figure 4:
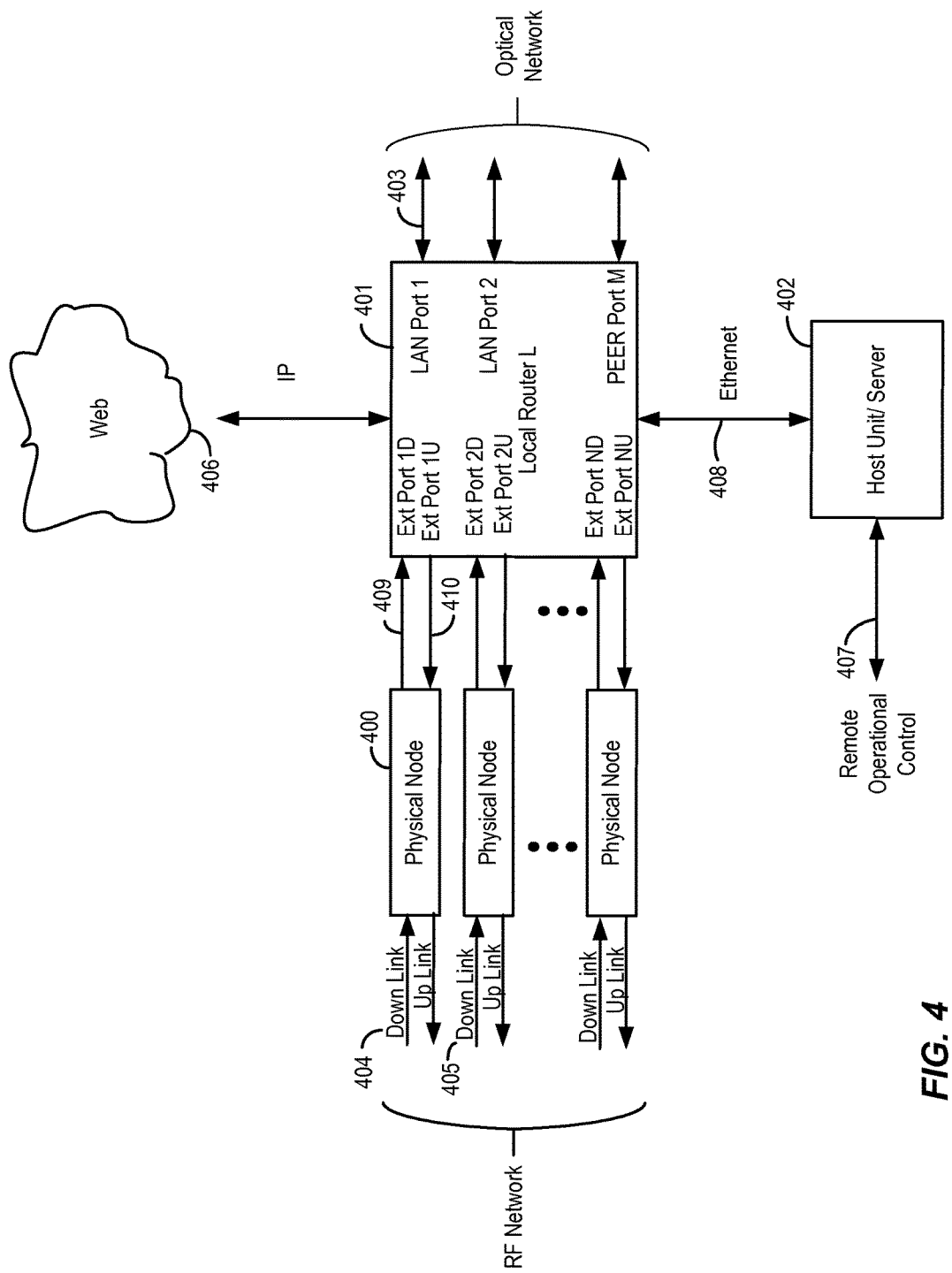
FIG. 4 is a block diagram illustrating a DAU, which contains physical Nodes and a Local Router, according to an embodiment of the present invention.

FIG. 4 shows an embodiment whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port.

Figure 5:
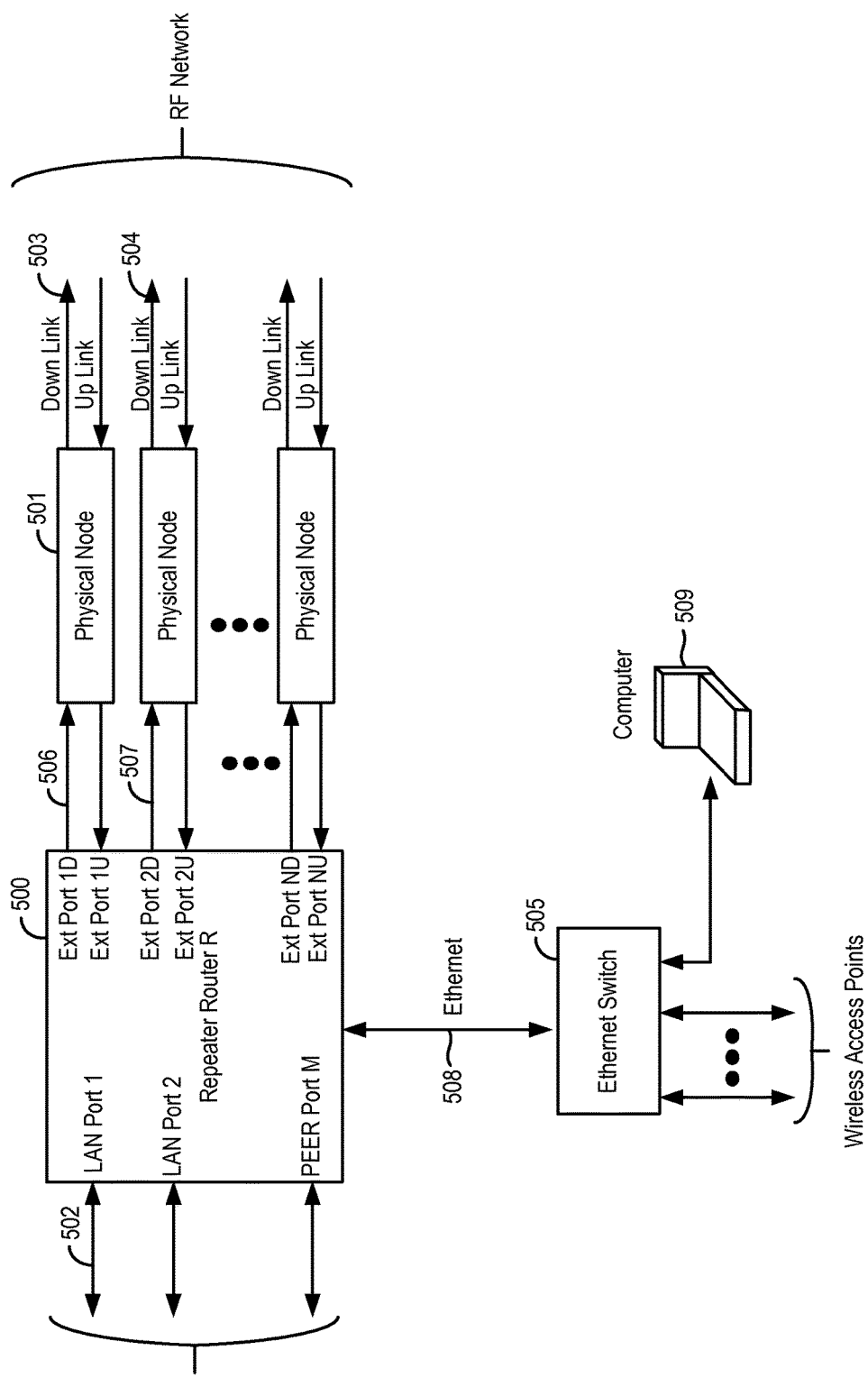
FIG. 5 is a block diagram illustrating a DRU according to an embodiment of the present invention.

FIG. 5 shows the two elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the mobile users at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains an Ethernet Switch (505) so that a remote computer or wireless access points can connect to the internet.

Figure 6:
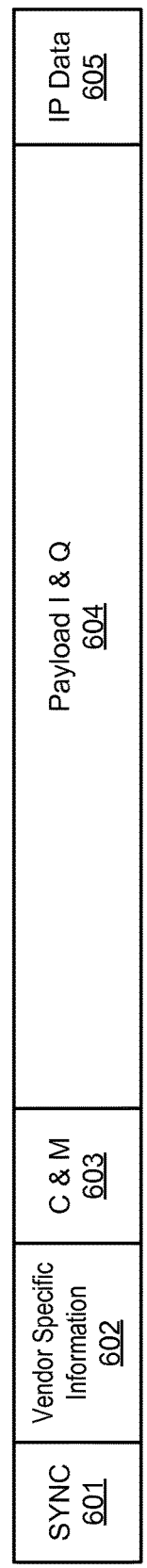
FIG. 6 shows an embodiment of the frame structure for the data that is transported between the DAU and DRUs.

FIG. 6 shows an embodiment of the frame structure for the data that is transported between the DAU and DRUs. As illustrated in FIG. 6, the mapping of the data frame structure used to communicate between the DAU and the DRUs is shown. The data frame structure includes five portions or elements; the SYNC portion 601, the Vendor specific information portion 602, the control and management (C&M) portion 603, the payload data portion 604, and the IP Data portion 605. The SYNC portion 601 is used at the receiver to synchronize the clock of the transported data. The vendor specific information portion 602 is allocated for identifying the individual vendor information, which can include IP addresses associated with information and other information that can be specific to a particular vendor (e.g., a wireless carrier). The control and management portion 603 is used to monitor and control the remote units as well as perform software upgrades. Network control information and performance monitoring along with control signals can be transmitted in the C&M portion 603. The payload I/Q data portion 604 includes the cellular baseband data from the BTS 108 or from the RF antenna port 320.

The IP data 605 is framed along with the payload I/Q data for transmission between the DAU and the DRUs. The IP data can include IP traffic passing through the Ethernet router 242 or through the Ethernet switch 310. The framing of the IP data along with the cellular data enables both types of data to be transported through the system in either the upstream or downstream paths utilizing optical fiber as illustrated herein.

Figure 7:
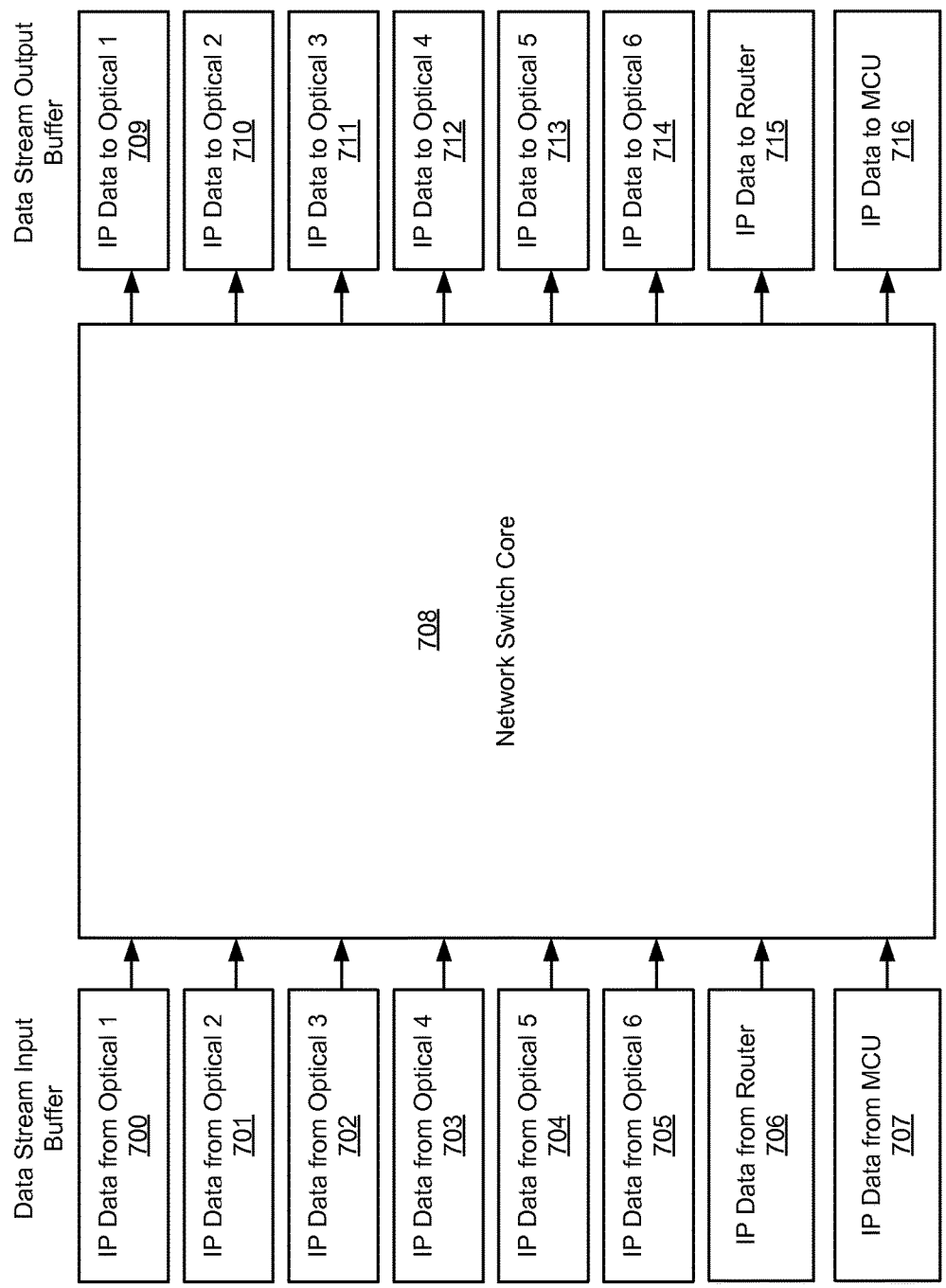
FIG. 7 is a schematic block diagram illustrating a Network Switch architecture for the multiple inputs and outputs of the IP data according to an embodiment of the present invention.

FIG. 7 is a schematic block diagram of a Network Switch architecture for the multiple inputs and outputs of the IP data according to an embodiment of the present invention. As illustrated in FIG. 7, the Network Switch interfaces between the Input Ports and Output Ports. The network switch 700 can reside in either the host unit (i.e., the DAU), the remote unit (i.e., the DRU), or both host and remote units. The IP Data from the optical ports of the DRU or DAU are separated from the payload I & Q data in each frame. IP data can originate from an external router or from the Microprocessor in the DRU or DAU. The IP Network Traffic from multiple input ports are buffered and delivered to a network switch. The Network Switch routes the IP data from the multiple input ports to the multiple output ports.

Considering an implementation in which the Network Switch 700 is resident in a DAU, the upstream optical data from the DRUs is received at ports coupled to the data stream input buffer and is represented by IP data from optical fiber 1 (700), IP data from optical fiber 2 (701), IP data from optical fiber 3 (702), IP data from optical fiber 4 (703), IP data from optical fiber 5 (704), and IP data from optical fiber 6 (705). Although IP data coming over all six fibers to the DAU is discussed, this is not required by the present invention and the IP data can be received at less than all the fibers provided by the system. The IP data received from the remotes through the optical fibers (700 through 705) can be considered as upstream data in this example. The network switch core 708 routes the upstream IP data to router port 715, illustrated by "IP data to Router," which can be referenced to Ethernet Router 242 in FIG. 2. The IP data included in the frames received in the upstream data flow is separated by the Network Switch core 708 and delivered to the router.

Considering the downstream data flow, IP data is received at router port 706, illustrated by "IP data from Router," which can be referenced to Ethernet Router 242 in FIG. 2. This downstream data is received by the DAU at Ethernet Router 242. The downstream data received at the data stream input buffer (IP Data from Router 706) is processed by the Network Switch Core 708 for transmission to the appropriate DRU through the optical cables connecting the DAU and the DRU. As illustrated in FIG. 7, in the downstream path, the IP data is distributed to the ports of the DAU, i.e., IP Data to Optical 1 (709), IP Data to Optical 2 (710), IP Data to Optical 3 (711), IP Data to Optical 4 (712), IP Data to Optical 5 (713), and IP Data to Optical 6 (714). As an example, downstream data requested by a DRU connected using optical fiber port 1 would be received by the DAU at Ethernet Router 242 (IP data from router 706), routed by the network switch core 708 and transmitted optical fiber port 1 (IP Data to Optical 1 709).

In addition to the IP data traffic, control and managements communications are transported between the host (e.g., DAU) and the remotes (e.g., DRUs). As illustrated in FIG. 2, the DAU includes Main CPU 240. In the downstream path, data from the Main CPU is processed by FPGA 205 and delivered to the remotes through optical fibers 201A - 201F. At the remote, it can be processed using CPU 311. In the upstream path, data from CPU 311 in the DRU is processed by FPGA 312 and delivered to the host through one or more of Fibers 1-N. At the host, it can be processed using the Main CPU 240. Referring to FIG. 7, the downstream data flow is illustrated by IP Data from MCU 707 switched to IP Data to Optical 1-6 (709-714). The upstream data flow is illustrated by IP Data from Optical 1-6 (700-705) switched to IP Data to MCU 716. Thus, embodiments of the present invention enable the control and management data to be processed and framed with the IP data and then transmitted to the remotes in the downstream path and/or received from the remotes in the upstream path.

Thus, upstream data (IP Data from Optical 1-6 (700-705) switched to IP Data to Router 715 and IP Data to MCU 716) as well as downstream data flow (IP Data from Router 706 and IP Data from MCU 707) switched to IP Data to Optical 1-6 (709-714) is illustrated in FIG. 7.

Figure 8:
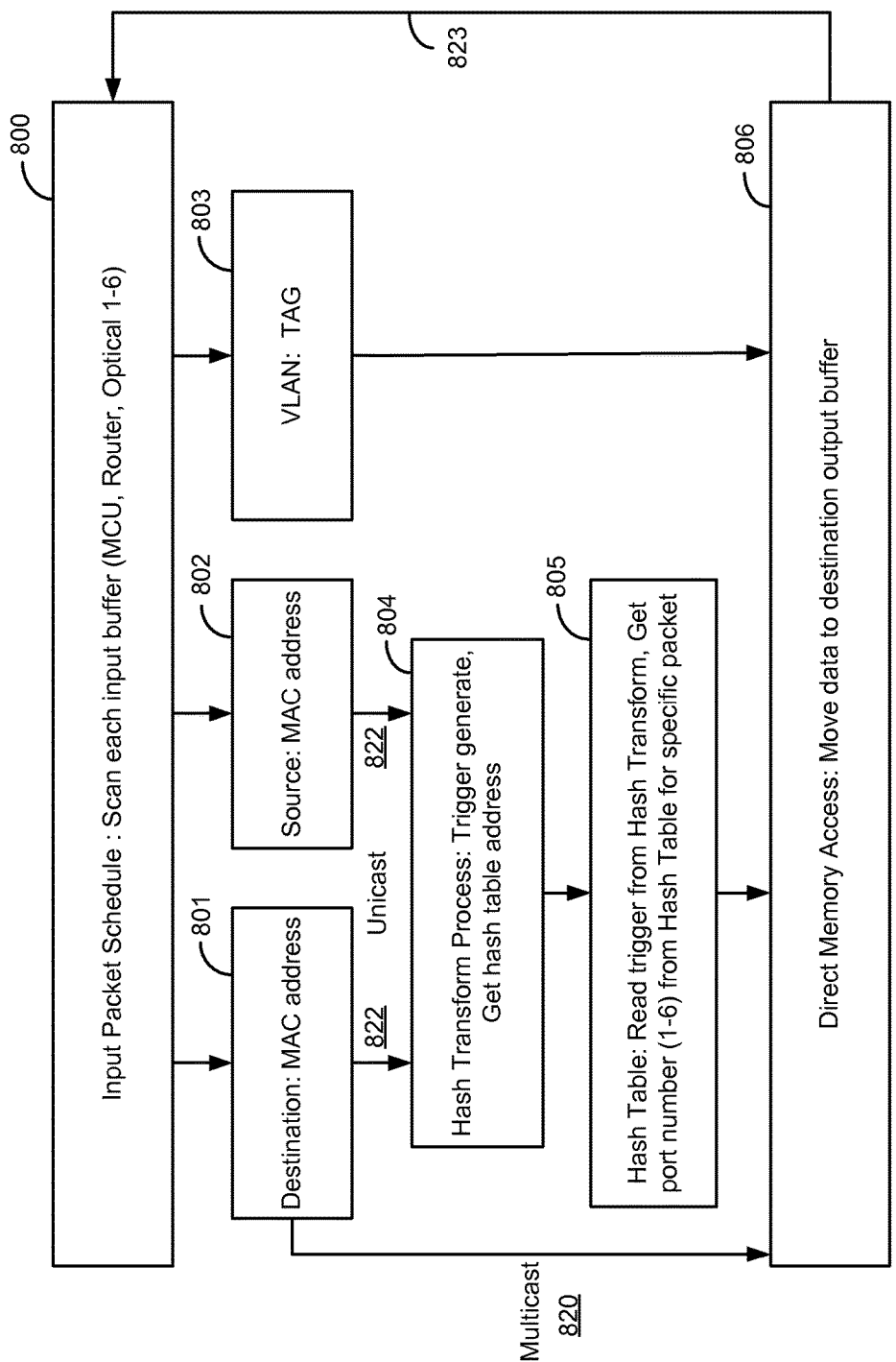
FIG. 8 is a simplified flowchart illustrating the data flow through the Network Switch Core according to an embodiment of the present invention.

FIG. 8 is a simplified flowchart illustrating the data flow through the Network Switch Core according to an embodiment of the present invention. The IP data from the various inputs (MCU, Router, Optical ports 1-6) are buffered and scanned by the input packet scheduler 800. Referring to FIG. 7, the processes in the input packet scheduler 800 are represented by data received at the data stream input buffer (700 through 707). The input packets are buffered and scanned for their MAC address, which identifies their Destination/Source address or whether they have a VLAN tag, which can be used for a remote with a virtual address such as a Wi-Fi access point connected to a DRU. Thus, both the Destination MAC address 801, the Source MAC address 802, and/or the VLAN tag 803 are determined by the Input Packet Scheduler 800. Scanning of the input buffer can be prioritized, for example to process cellular data before IP traffic, or the like.

If the Destination address is identified as Multicast (820), then the input is sent to the destination output buffers 806 of the Network Switch for broadcast to all remotes. Referring to FIG. 7, the processes in the Direct Memory Access 806 are represented by data output at the data stream output buffer (709 through 716). If the Destination address is identified as Unicast (822), then the Source MAC address 802 is fed to the Hash Transform Process 804 along with the Destination MAC address 801. The Hash Transform Process 804 and Hash Table 805 are used to identify the routing path between the Input buffer for the IP data and the Output buffer for the IP data for the specific remote. The Hash Transform translates the MAC address to a Hash address and the Hash Table translates the Hash Address to the port number (e.g., MCU, Router, Optical ports 1-6). Although only seven ports are illustrated in Hash Table 805, the number of ports is not limited to this particular number and additional ports, for example, eight ports or more ports can be utilized.

In each clock cycle, the process of scanning the input buffer and moving data to the output buffer is repeated as illustrated by iteration path 823.

FIG. 9 shows the Hash Table Structure that maps the MAC address to a Hash address. Pnum is the port number and TTL is the Time to live. 256 Hash addresses and 16 sub-addresses are identified in the table as mapped to the MAC address, shown in the last column. One of ordinary skill in the art would recognize many variations, modifications, and alternatives.

Figure 10:
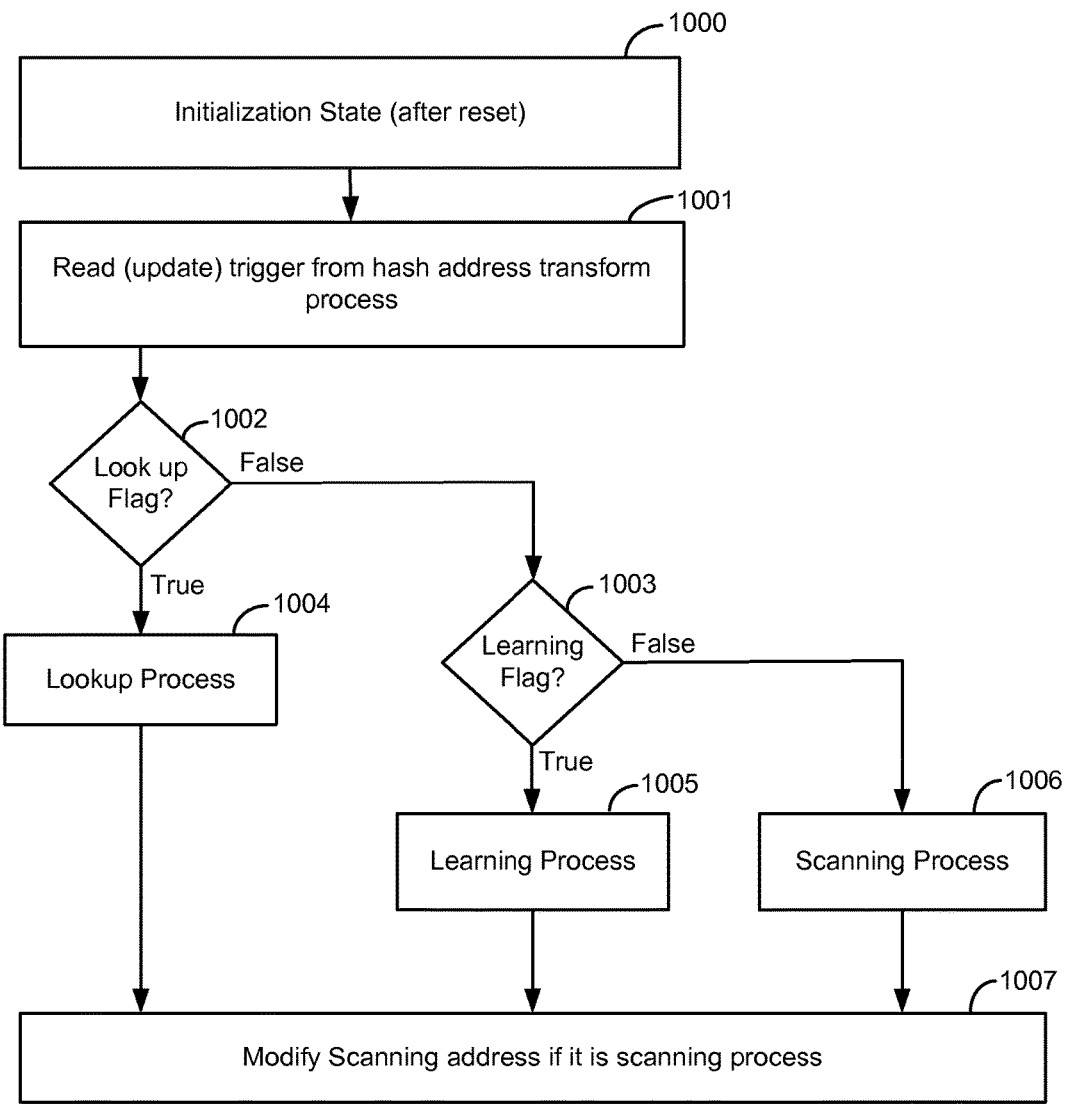
FIG. 10 is a simplified flowchart illustrating the flow diagram for the Hash Table Scheduler.

FIG. 10 is a simplified flowchart illustrating the flow diagram for the Hash Table Scheduler. As described below, the flow diagram for the Hash Table Scheduler illustrates how the Hash Table illustrated in FIG. 9 is populated, assigning MAC addresses to the corresponding port and remote.

The process starts in the initialization state (1000) after a reset is performed. The trigger is read from the hash address process to identify if the routing path of the IP data between the source and destination has changed (1001). If the Lookup Flag trigger is true, then the Hash Table address is a lookup Process in the Hash Table. The lookup process 1004 is thus used when the correspondence between the MAC address and the corresponding port and remote is known and can be read from the Hash Table.

If the Lookup Flag trigger is false, which can be the case when data is first sent to a MAC address, then the Learning Flag is observed (1003). If the Learning Flag is true, then the Learning process is initiated (1005) whereby a new Hash Address is identified for the MAC address in the Hash Table. If the Learning Flag is false then the Scanning process (1006) is initiated and the Hash Addresses are scanned in the Hash Table. The scanning address can be modified (1007) as part of the scanning process, which can be appropriate, for example, if an address has been changed. The Hash Table could then be updated as a result of the modified scanning process.

It should be appreciated that the specific processing steps illustrated in FIG. 8 to FIG. 10 provide a particular embodiment of the present invention. Other sequences of steps may also be performed according to alternative embodiments. For example, alternative embodiments of the present invention may perform the steps outlined above in a different order. Furthermore, additional steps may be added or removed depending on the particular applications. One of ordinary skill in the art would recognize many variations, modifications, and alternatives.

Figure 11:
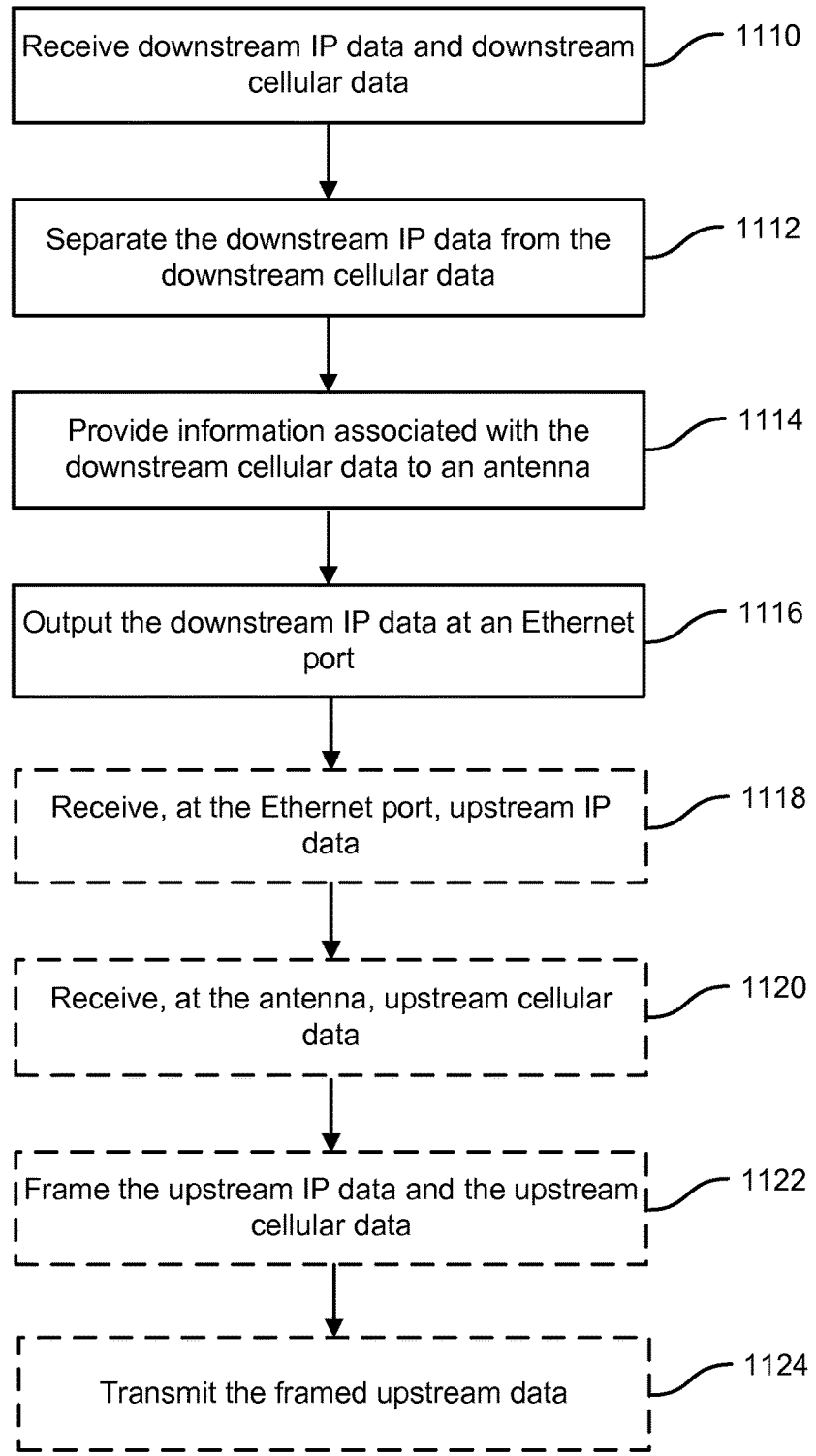
FIG. 11 is a simplified flowchart illustrating a method of operating a DRU of a DAS according to an embodiment of the present invention.

FIG. 11 is a simplified flowchart illustrating a method of operating a DRU of a DAS according to an embodiment of the present invention. The method includes receiving, at the DRU of the DAS, downstream IP data and downstream cellular data (1110). The downstream IP data and downstream cellular data can be received in a packet framed as illustrated in FIG. 6. As discussed in relation to FIG. 3, the downstream IP data and the downstream cellular data can be received at one of several optical ports provided by the DRU. The optical ports of the DRU can be connected using optical fiber to optical input/output ports of a DAU, can be connected to optical ports of other DRUs in a daisy chain configuration, or the like. The method also includes separating the downstream IP data from the downstream cellular data (1112) by deframing a packet including the downstream IP data and the downstream cellular data. It should be noted that in addition to deframing, other signal processing techniques can be used.

The method also includes providing information associated with the downstream cellular data to an antenna coupled to the DRU (1114) and outputting the downstream IP data at an Ethernet port of the DRU (1116). As discussed in relation to FIG. 3, after the packet including the cellular data and the is deframed, the cellular data can be processed using digital to analog converters, upconverters, amplifiers, and the like before being transmitted through the antenna. Thus, the discussion of receiving cellular data, for example, through Fiber 1 in FIG. 3 and transmitting cellular data, for example, through the Tx/Rx Antenna in FIG. 3 is not intended to connote that the same or an identical cellular data signal is received and transmitted since an amplified version of an analog version of the received digital cellular data can be transmitted. The same discussion is applicable as appropriate to upstream cellular data as well as downstream IP data and upstream IP data, which can be modified as appropriate for internet protocols.

In some embodiments, upstream data flow is also performed. In these embodiments, the method further includes receiving, at the Ethernet port of the DRU, upstream IP data (1118) and receiving, at the antenna coupled to the DRU, upstream cellular data (1120). The method also includes framing the upstream IP data and information associated with the upstream cellular data (1122) and transmitting the framed upstream data from the DRU (1124). As illustrated in FIG. 3, the framed upstream data can be transmitted using the one or more optical input/output ports of the DRU connected to the illustrated Fibers 1 through N.

It should be appreciated that the specific steps illustrated in FIG. 11 provide a particular method of operating a DRU of a DAS according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
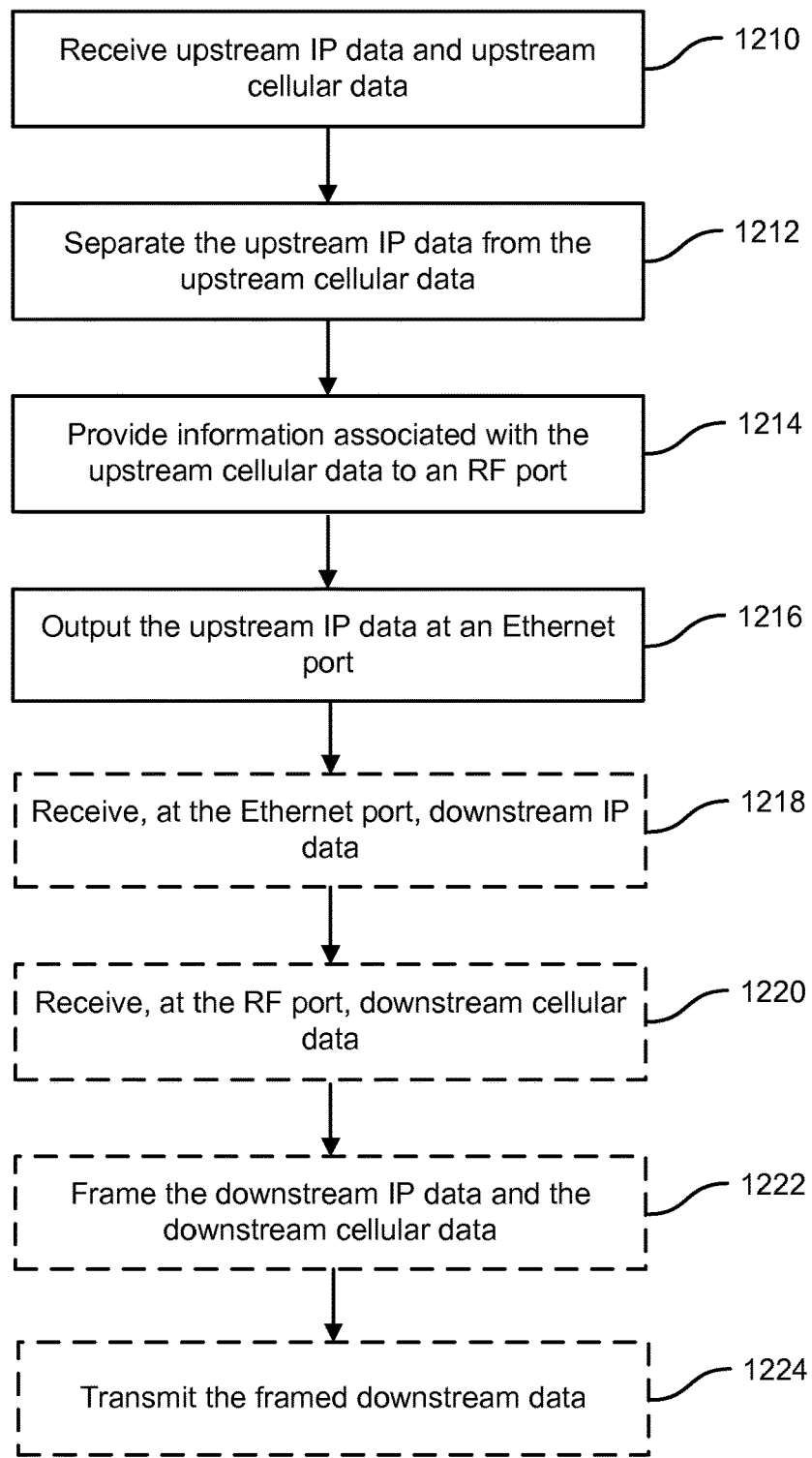
FIG. 12 is a simplified flowchart illustrating a method of operating a DAU of a DAS according to an embodiment of the present invention.

FIG. 12 is a simplified flowchart illustrating a method of operating a DAU of a DAS according to an embodiment of the present invention. The method includes receiving, at the DAU, upstream IP data and upstream cellular data (1210) and separating the upstream IP data from the upstream cellular data (1212). The upstream IP data and the upstream cellular data can be received at one of the plurality of optical ports provided by the DAU as illustrated by fibers 201A through 201F in FIG. 2. Separating the upstream IP data from the upstream cellular data can include deframing a packet including the upstream IP data and the upstream cellular data as discussed in relation to FIG. 6.

The method also includes providing information associated with the upstream cellular data to an RF port of the DAU (1214) and outputting the upstream IP data at an Ethernet port of the DAU (1216). As discussed in relation to FIG. 11, processing of the IP data and cellular data can be performed as appropriate.

In some embodiments, the method also includes receiving, at the Ethernet port of the DAU, downstream IP data (1218) and receiving, at the RF port of the DAU, downstream cellular data (1220). In these embodiments, the method further includes framing the downstream IP data and information associated with the downstream cellular data (1222) and transmitting the framed downstream data from the DAU (1224). Transmitting the framed downstream data can be performed at one of the plurality of optical ports provided by the DAU.

It should be appreciated that the specific steps illustrated in FIG. 12 provide a particular method of operating a DAU of a DAS according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ADC Analog to Digital Converter
BPF Bandpass Filter
DAC Digital to Analog Converter
DDC Digital Down Converter
DNC Down Converter
DPA Doherty Power Amplifier
DSP Digital Signal Processing
DUC Digital Up Converter
FPGA Field-Programmable Gate Array
I-Q In-phase/Quadrature
IF Intermediate Frequency
LO Local Oscillator
LPF Low Pass Filter
MCPA Multi-Carrier Power Amplifier
OFDM Orthogonal Frequency Division Multiplexing
PA Power Amplifier
QAM Quadrature Amplitude Modulation
QPSK Quadrature Phase Shift Keying
RF Radio Frequency
UMTS Universal Mobile Telecommunications System
UPC Up Converter
WCDMA Wideband Code Division Multiple Access
WLAN Wireless Local Area Network

What is claimed is:

1. A system for transporting IP data in a Distributed Antenna System, the system comprising:
    at least one Digital Access Units (DAU) having a plurality of optical input ports and at least one Ethernet port;
    a plurality of Digital Remote Units (DRUs) coupled to the at least one DAU, wherein each of the plurality of DRUs has a plurality of optical output ports and at least one Ethernet port, and wherein each of the plurality of DRUs is operable to transmit upstream IP data and upstream cellular data to the at least one DAU over one or more of the plurality of optical output ports;
    wherein the at least one DAU includes:
        a Deframer operable to separate the upstream cellular data from the upstream IP data;
        a data stream input buffer operable to store at least the upstream IP data; and
        a network switch including a scheduler operable to scan the data stream input buffer and route the upstream IP data to the at least one Ethernet port of the DAU in accordance with a routing path identified in a routing table;
    wherein scanning of the data stream input buffer is prioritized between the upstream IP data and the upstream cellular data.

2. The system of claim 1 wherein each of the plurality of DRUs is coupled to one or more transmit/receive antennas.

3. The system of claim 1 wherein the network switch is operable to receive a plurality of IP data streams associated with the plurality of optical input ports of the DAU.

4. The system of claim 3 wherein the network switch is operable to receive IP data from the at least one Ethernet port of the at least one DAU and IP data from a CPU of the at least one DAU.

5. A system for transporting IP data in a Distributed Antenna System, the system comprising:
    at least one Digital Access Units (DAU) having a plurality of optical output ports and at least one Ethernet port;
    a plurality of Digital Remote Units (DRUs) coupled to the at least one DAU, wherein each of the plurality of DRUs has a plurality of optical input ports and at least one Ethernet port, wherein the at least one DAU is operable to transmit downstream IP data and downstream cellular data to the plurality of DRUs over one or more of the plurality of optical output ports;
    wherein each of the plurality of DRUs includes:
        a Deframer operable to separate the downstream cellular data from the downstream IP data;

a data stream input buffer operable to store at least the downstream IP data; and a network switch including a scheduler operable to scan the data stream input buffer and route the downstream IP data to the at least one Ethernet port of the DRU in accordance with a routing path identified in a hash table;

wherein scanning of the data stream input buffer is prioritized between the downstream IP data and the downstream cellular data.

6. The system of claim 5 wherein the at least one DAU further comprises a plurality of RF input/output ports.

7. The system of claim 5 wherein each of the plurality of DRUs is coupled to one or more transmit/receive antennas.

8. The system of claim 5 wherein the network switch is operable to receive a plurality of IP data streams associated with the plurality of optical input ports.

9. The system of claim 8 wherein the network switch is operable to receive IP data from the at least one Ethernet port of the DAU and IP data from a CPU of the DAU.

10. A method of operating a Distributed Antenna System (DAS), the method comprising:

receiving, by a Digital Remote Unit (DRU) of the DAS at one or more of a plurality of optical input ports of the DRU, downstream IP data and downstream cellular data from a Digital Access Unit (DAU) of the DAS;

separating, by a Deframer of the DRU, the downstream IP data from the downstream cellular data;

storing at least the downstream IP data in a data stream input buffer of the DRU;

scanning, by a network switch including a scheduler of the DRU, the data stream input buffer; and routing, by the network switch including the scheduler, the downstream IP data to an Ethernet port of the DRU in accordance with a routing path identified in a hash table;

wherein scanning of the data stream input buffer id prioritized between the downstream IP data and the downstream cellular data.

11. The method of claim 10 wherein the downstream IP data and the downstream cellular data are received at a single optical port of the plurality of optical input ports.

12. The method of claim 10 wherein separating the downstream IP data from the downstream cellular data comprises deframing a packet including the downstream IP data and the downstream cellular data.

13. The method of claim 10 further comprising:

receiving, at the Ethernet port of the DRU, upstream IP data;

receiving, at the one or more antennas coupled to the DRU, upstream cellular data;

framing the upstream IP data and information associated with the upstream cellular data; and transmitting the framed upstream data from the DRU.

14. The method of claim 13 wherein transmitting the framed upstream data is performed at one of the plurality of optical input ports of the DRU.

15. A method of operating a Distributed Antenna System (DAS), the method comprising:

receiving, by a Digital Access Unit (DAU) of the DAS at one or more of a plurality of optical input ports of the DAU, upstream IP data and upstream cellular data from a Digital Remote Unit (DRU) of the DAS;

separating, by a Deframer of the DAU, the upstream IP data from the upstream cellular data;

storing at least the upstream IP data in a data stream input buffer of the DAU;

scanning, by a network switch including a scheduler of the DAU, the data stream input buffer; and routing, by the network switch including the scheduler, the upstream IP data to an Ethernet port of the DAU in accordance with a routing path identified in a hash table;

wherein scanning of the data stream input buffer is prioritized between the upstream IP data and the upstream cellular data.

16. The method of claim 15 wherein the upstream IP data and the upstream cellular data are received at a single optical port of the plurality of optical input ports.

17. The method of claim 15 wherein separating the upstream IP data from the upstream cellular data comprises defraying a packet including the upstream IP data and the upstream cellular data.

18. The method of claim 15 further comprising:

receiving, at the Ethernet port of the DAU, downstream IP data;

receiving, at an RF port of the DAU, downstream cellular data; framing the downstream IP data and information associated with the downstream cellular data; and transmitting the framed downstream data from the DAU.

19. The method of claim 18 wherein transmitting the framed downstream data is performed at one of the plurality of optical input ports of the DAU.

\* \* \* \* \*